(12) United States Patent
Sung

(10) Patent No.: US 11,716,115 B2
(45) Date of Patent: Aug. 1, 2023

(54) SIGNAL PROCESSING SYSTEM AND METHOD FOR IDENTIFYING AND PAIRING A SIGNAL TRANSMITTING DEVICE

(71) Applicant: Realtek Semiconductor Corp., HsinChu (TW)

(72) Inventor: Lien-Hsiang Sung, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/667,560

(22) Filed: Feb. 9, 2022

(65) Prior Publication Data
US 2022/0399916 A1 Dec. 15, 2022

(30) Foreign Application Priority Data
Jun. 10, 2021 (TW) .................................. 110121138

(51) Int. Cl.
*H04B 3/02* (2006.01)

(52) U.S. Cl.
CPC ....................................... *H04B 3/02* (2013.01)

(58) Field of Classification Search
CPC ........................................................ H04B 3/02
See application file for complete search history.

(56) References Cited

U.S. PATENT DOCUMENTS

| 8,065,362 | B2 * | 11/2011 | Greven ............ G06Q 10/06311 709/204 |
| 2002/0128931 | A1 * | 9/2002 | Himmel ................. G06Q 30/06 705/26.41 |
| 2011/0264968 | A1 | 10/2011 | Shilo | |

* cited by examiner

*Primary Examiner* — Sung S Ahn
(74) *Attorney, Agent, or Firm* — Winston Hsu

(57) ABSTRACT

A signal processing system includes a signal processing device including a processor and a memory device storing first information and a signal transmitting device including a memory device storing second information. The processor reads the memory devices to obtain the first information and the second information, determines a threshold date according to a first date indicated by the first information and a margin, and determines whether a second date indicated by the second information is earlier than the threshold date. When the second date is earlier than the threshold date, the processor controls the signal processing device to operate in a limited mode. In the limited mode, the signal processing device does not output any signal to the signal transmitting device or ignores any signal from the signal transmitting device, or the signal processing device only outputs a limited signal to the signal transmitting device.

12 Claims, 2 Drawing Sheets

SIGNAL PROCESSING SYSTEM AND METHOD FOR IDENTIFYING AND PAIRING A SIGNAL TRANSMITTING DEVICE

BACKGROUND OF THE INVENTION

1. Field of the Invention

The invention relates to a method for identifying and pairing a signal transmitting device and a signal processing system implementing the method.

2. Description of the Prior Art

A cable or a transmission line is a commonly used signal transmitting devices, which is coupled between two electronic devices to transmit electronic signals. In order to make existing electronic devices more distinctive, current electronic device developers not only focus on the functions and performance of electronic device itself, but also make corresponding adjustments to the cables or transmission lines, so that the performance of the final product can be more prominent and get the favor of consumers.

With such special design, the identification and pairing between the electronic device and the cable/transmission line has become an important operation. Especially, in order to prevent the electronic devices and cables/transmission lines from being maliciously copied by unauthorized vendors (which may be understood as illegal manufacturers/users) in the market, while maintaining the convenience in manufacturing, maintaining and inventory managing of the products, a method that can effectively identify and pair the signal transmitting devices and a signal processing system implementing such method are required.

SUMMARY OF THE INVENTION

An objective of the invention is to effectively identifying and pairing a signal transmitting device to prevent the electronic devices and the signal transmitting device from being maliciously copied by unauthorized vendors in the market, while maintaining the convenience in manufacturing, maintaining and inventory managing of the products.

According to an embodiment of the invention, a signal processing system comprises a signal processing device and a signal transmitting device. The signal processing device comprises a processor and a memory device configured to store first information. The signal transmitting device is coupled to the signal processing device and comprises a memory device configured to store second information. In a procedure for identifying and pairing a signal transmitting device, the processor is configured to read the memory device of the signal processing device to obtain the first information, read the memory device of the signal transmitting device to obtain the second information, determine a threshold date according to a first date indicated by the first information and a margin, and determines whether a second date indicated by the second information is earlier than the threshold date. When the processor determines that the second date is earlier than the threshold date, the processor controls the signal processing device to operate in a limited mode. In the limited mode, the signal processing device is configured not to output any signal to the signal transmitting device or ignore any signal from the signal transmitting device, or the signal processing device only output a limited signal to the signal transmitting device.

According to another embodiment of the invention, a method for identifying and pairing a signal transmitting device comprises: reading a memory device of a signal processing device in a signal processing system to obtain first information; reading a memory device of the signal transmitting device in the signal processing system to obtain second information; determining a threshold date according to a first date indicated by the first information and a margin; determining whether a second date indicated by the second information is earlier than the threshold date; and controlling the signal processing device to operate in a limited mode when the second date is determined earlier than the threshold date. In the limited mode, the signal processing device is configured not to output any signal to the signal transmitting device or ignore any signal from the signal transmitting device, or the signal processing device is configured to only output a limited signal to the signal transmitting device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
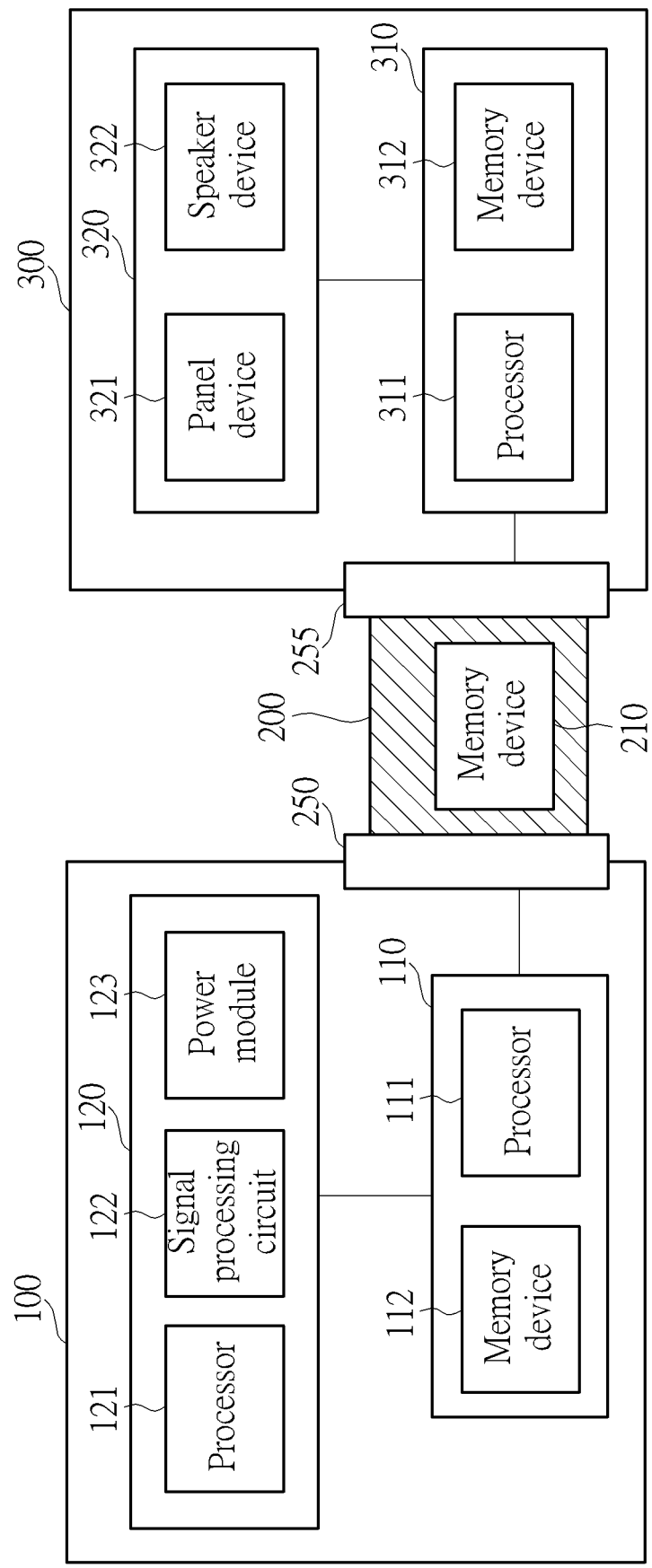
FIG. 1 shows a block diagram of a signal processing system according to an embodiment of the invention.

FIG. 1 shows a block diagram of a signal processing system according to an embodiment of the invention. The signal processing system may comprise a host device 100, a signal transmitting device 200, and a display device 300. In an embodiment of the invention, the host device 100 may be used as a signal source and configured to output at least one signal (e.g., a power signal, a control signal, a video signal, an image signal, an audio signal, etc.), and the display device 300 may receive the signal provided by the host device 100 through the signal transmitting device 200. According to an embodiment of the invention, the host device 100 may be, for example, but not limited to, the host device of a separated TV, a mobile device such as a mobile phone or a tablet, a computing device such as a laptop or a desktop computer, a set-top box (STB), a compact disc (CD)/Digital Versatile Disc (DVD) player or other electronic products. The display device 300 may be, for example, but not limited to, a display panel of the separated TV, a screen, or an electronic product such as a digital TV.

The signal transmitting device 200 may be a pluggable or removable physical device coupled between the host device 100 and the display device 300 and utilized for transmitting power signal, control signal, current signal, voltage signal, video signal, audio signal, or any communication signal generated in compliance with any communication protocol, between the host device 100 and the display device 300. In an embodiment of the invention, the signal transmitting device 200 may be a cable, and the cable may be implemented in compliance with any known specifications, such as, but not limited to, the High Definition Multimedia Interface (HDMI) specifications, the Universal Serial Bus (USB) specifications, etc., or may be implemented in compliance with other special specifications (e.g., a dedicated product specification defined by a product manufacturer or a modified product specification modified based on an existing specification).

It is to be noted that FIG. 1 is a simplified block diagram of the signal processing system, in which the signal transmitting device 200 is represented by a grid block. However, the proposed signal transmitting device 200 of the invention is not limited to the shape or appearance as shown in FIG. 1. For example, the signal transmitting device 200 may actually comprise one or more of the plugs or connectors, such as the connector 250 and the connector 255, used to connect the host device 100 and the display device 300, and a transmission line used to transmit signals. In addition, it is to be noted that FIG. 1 is illustrated by way of example, in which the elements are not necessarily drawn to scale.

According to an embodiment of the invention, the host device 100 may at least comprise a signal processing device 110 and a chip device 120, such as an SoC (System on a Chip). The signal processing device 110 may be, as an example but not limited to, a bridge device configured to perform signal conversion on one or more signals received from or provided to the signal transmitting device 200. The chip device 120 may be, as an example but not limited to, the host chip of a separated TV, and configured as a signal source of the signal processing system. As an example, the chip device 120 may obtain the power signal and/or the signal to be displayed by the display device 300 in a wired or wireless manner, and, after some proper signal processing, provide the received signal to the signal processing device 110 in compliance with an internal communication protocol (as an example but not limited to, the V-by-One communication protocol, the DP (Display Port) communication protocol, etc.). The signal processing device 110 may perform signal conversion, comprising communication protocol conversion, on the received signal and provided the processed signal to the signal transmitting device 200, for the signal to be transmitted to the display device 300 through the signal transmitting device 200 in compliance with an external communication protocol (as an example but not limited to, the standard or modified HDMI or USB protocol). It is to be noted that the signal transmissions through the chip device 120, the signal processing device 110 and the signal transmitting device 200 may be bidirectional. Therefore, the signal processing device 110 may also perform reverse signal and communication protocol conversion on the signal received from the signal transmitting device 200 based on the similar logic.

According to an embodiment of the invention, the aforementioned internal communication protocol and external communication protocol of the host device 100 may be different communication protocols. As an example, the internal communication protocol may be designed as the protocol suitable for relative short distance and relative slow speed transmission, while the external communication protocol may be designed as the protocol suitable for relative long distance and relative high speed transmission. To be more specific, in the embodiments of the invention, the overall transmission bandwidth achieved in compliance with the external communication protocol may be greater than or equal to the overall transmission bandwidth achieved in compliance with the internal communication protocol. Therefore, in an embodiment of the invention, the number of channels or lines configured outside of the host device 100 and operate in compliance with the external communication protocol may be less than the number of channels or lines configured inside of the host device 100 and operate in compliance with the internal communication protocol. In this manner, the size of the signal transmitting device 200 can be effectively reduced, and the effect to beautify the signal transmitting device 200 is achieved.

The signal processing device 110 may comprise a processor 111 and a memory device 112. The processor 111 may be configured to control operations of the signal processing device 110, and the memory device 112 may be configured to store data required for the operations of the signal processing device 110. The chip device 120 may comprise a processor 121, a signal processing circuit 122 and a power module 123. The processor 121 is configured to control operations of the chip device 120. The signal processing circuit 122 is configured to process the received signals, for example, performing a variety of image or audio signal optimization processes. The power module 123 is configured to control the overall power system of the host device 100, which may further comprise the devices for power control, power monitoring and/or power output. It is to be noted that in some embodiments, the processor 111 and/or 121 may be implemented by a general-purpose processor or a micro-processor, and the processor 121 and the signal processing circuit 122 may be integrated as a single signal processor device.

The display device 300 may at least comprise a signal processing device 310 and a display panel 320. The signal processing device 310 may be, as an example but not limited to, a bridge device configured to perform signal conversion, comprising the communication protocol conversion, on one or more signals received from or provided to the signal transmitting device 200. For example, the signal processing device 310 may receive signals from the signal transmitting device 200 in compliance with the aforementioned external communication protocol and perform signal conversion, comprising communication protocol conversion, on the received signals, for the signal to be transmitted to the display panel 320 in compliance with the internal communication protocol. Similarly, the signal transmissions through the signal transmitting device 200, the signal processing device 310 and the display panel 320 may be bidirectional. Therefore, the signal processing device 310 may also perform reverse signal and communication protocol conversion on the signals received from the display panel 320 based on the similar logic.

According to an embodiment of the invention, the aforementioned internal communication protocol and external communication protocol of the display device 300 may be different communication protocols. As an example, similarly, the internal communication protocol of the display device 300 may be designed as the protocol suitable for relative short distance and relative slow speed transmission, while the external communication protocol may be designed as the protocol suitable for relative long distance and relative high speed transmission. Regarding the illustrations of the internal communication protocol and external communication protocol of the display device 300, reference may be made to the corresponding paragraphs as discussed above for the host device 100, and will not be described herein for brevity.

The signal processing device 310 may comprise the processor 311 and the memory device 312. The processor 311 may be configured to control operations of the signal processing device 310, and the memory device 312 may be configured to store data required for the operations of the signal processing device 310. The display panel 320 may comprise a panel device 321 and/or a speaker device 322. It is to be noted that FIG. 1 shows only the elements related to the invention. Those skilled in this art will understand that the signal processing system, the host device 100 and display device 300 may further comprise other components not shown in FIG. 1, so as to implement the required signal processing functions.

According to an embodiment of the invention, besides the components such as connectors or plugs and transmission lines for transmitting signals, the signal transmitting device 200 may further comprise a memory device 210. It is to be noted that the invention is not limited to dispose the memory device 210 at any one of the transmission line or the connector or plug end of the signal transmitting device 200. As described above, in order to prevent the electronic devices and signal transmitting device from being maliciously copied by unauthorized vendors in the market, while maintaining the convenience in manufacturing, maintaining and inventory managing of the products, a method for effectively identifying and pairing a signal transmitting device and a signal processing system implementing the method have been proposed. In the proposed method, the memory device of at least one of the host device 100 and the display device 300, e.g., the memory device 112 and/or 312, may store date information, and the memory device 210 of the signal transmitting device 200 may also store date information. In the embodiments of the invention, by determining whether the date indicated by the aforementioned date information is a reasonable configuration, the host device 100 and/or the display device 300 is able to effectively identify and pair the signal transmitting device 200. For discrimination, in the following paragraphs, the date information stored in the memory devices of the host device 100 and/or the display device 300 may be collectively named as the "first information", and the date information stored in the memory device of the signal transmitting device 200 may be named as the "second information". In addition, since the proposed method for identifying and pairing a signal transmitting device may be implemented in either the host device 100 or the display device 300, in order to keep the disclosure concise, the term "signal processing device" in the following paragraphs will be utilized to represent the signal processing device 110 and/or the signal processing device 310 shown in FIG. 1, and the operation of the "signal processing device" is not limited to any one of the signal processing device 110 and the signal processing device 310.

According to an embodiment of the invention, the signal processing device may initiate a device identifying and pairing process when detecting that the signal transmitting device 200 is connected thereto. The signal processing device may detect whether there is any signal transmitting device connected thereto by using any method, such as actively transmitting polling signals, passively detecting whether a hardware insertion notification signal is received, or by trying to perform an access operation on the memory device of the signal transmitting device, or perform any detection operation for detecting whether there is any signal transmitting device connected to it.

In the device identifying and pairing process, the processor, e.g. the processor 111 or the processor 311, of the signal processing device may read the corresponding memory device to obtain the first information and read the memory device 210 of the signal transmitting device 200 to obtain the second information. The processor 111/311 may further determine a threshold date according to a first date indicated by the first information and a margin.

According to an embodiment of the invention, the aforementioned margin may be an allowable offset of time. As an example, the margin may be set to the length of one month or a predetermined number of days. The processor 111/311 may trace back to a date earlier than the first date according to the margin, and set it as the threshold date. For example, assuming that the first date indicated by the first information is 2021/02/01 and the margin is set to one month, the processor 111/311 may determine the threshold date as 2021/01/01.

Next, the processor 111/311 may determine whether a second date indicated by the second information is earlier than the threshold date, or determine whether a second date indicated by the second information is later than or the same as the threshold date. According to an embodiment of the invention, the signal transmitting device 200 will be determined as a signal transmitting device allowed to be used in the signal processing system (which may be understood as determining that the signal transmitting device is legal in the signal processing system) only when the second date is later than or the same as the first date.

In the embodiments of the invention, applying a margin to the first date corresponding to the host device 100 and/or the display device 300 is to increase the flexibility of determining whether the two dates are the same. To be more specific, in the embodiments of the invention, when the second date is different from the first date but falls within a time interval obtained by adding a margin to or subtracting the margin from the first date, the processor 111/311 may still determine that the second date is the same as the first date. Continuing the previous example, assuming that the margin is set to one month and the first date indicated by the first information is 2021/02/01, it means that the first date corresponding to the host device 100 and/or the display device 300 is 2021/02/01 and in such condition, as long as the second date falls within the time interval between 2021/01/01 and 2021/03/01, the processor 111/311 will determine that the second date is the same as the first date.

As described above, in the embodiments of the invention, the processor 111/311 may determine whether the signal transmitting device 200 is a signal transmitting device allowed to be used in the signal processing system (which may be understood as determining that the signal transmitting device is legal in the signal processing system) by determining whether the second date is later than or the same as one of the dates within the time interval obtained by applying the margin to the first date. If the determination result shows yes, the processor 111/311 may control the signal processing device to operate in a normal mode. If the determination result shows no, the processor 111/311 may control the signal processing device to operate in a limited mode.

Therefore, in the embodiments of the invention, the processor 111/311 may simply set the earliest date within the time interval obtained based on the first date and the margin as the threshold date, for example, the date 2021/01/01 in the previous example.

According to an embodiment of the invention, when the processor 111/311 determines that the second date is earlier than the threshold date, it means that the second date is not later than or the same as the first date. Therefore, the signal transmitting device 200 is determined as a signal transmitting device not allowed to be used in the signal processing system (which may be understood as determining that the signal transmitting device is illegal in the signal processing system). At this time, the processor 111/311 may control the corresponding signal processing device 110/310 to operate in a limited mode. In the limited mode, the corresponding signal processing device does not output any signal (e.g., the power signal, the voltage signal, the video signal, the audio signal, and so on) to the signal transmitting device, or may ignore any signal received from the signal transmitting device. That is, in the limited mode, the corresponding signal processing device does not perform the original operations of communication protocol conversion and signal conversion that are supposed to be performed, so that the signal transmitting device cannot be used in the signal processing system. Or, the corresponding signal processing device may only output a limited signal to the signal transmitting device in the limited mode. That is, in the limited mode, the corresponding signal processing device performs the original operations of communication protocol conversion and signal conversion that are supposed to be performed only on some limited signal. For example, the limiting signal may be a low-resolution image signal or may be a signal for conveying a warning message. In the limited mode, the corresponding signal processing device may only transmit the low-resolution image signal or the warning message to another terminal of the signal transmitting device, so that the signal processing system displays the warning message or the restricted low-resolution image through the display device to notify the user that this signal transmitting device is a product not allowed to be used in this signal processing system.

On the other hand, when the processor 111/311 determines that the second date is not earlier than the threshold date, it means that the second date is later than or the same to the first date and the signal transmitting device 200 is determined as a signal transmitting device allowed to be used in the signal processing system. At this time, the processor 111/311 controls the corresponding signal processing device 110/310 to operate in a normal mode.

Figure 2:
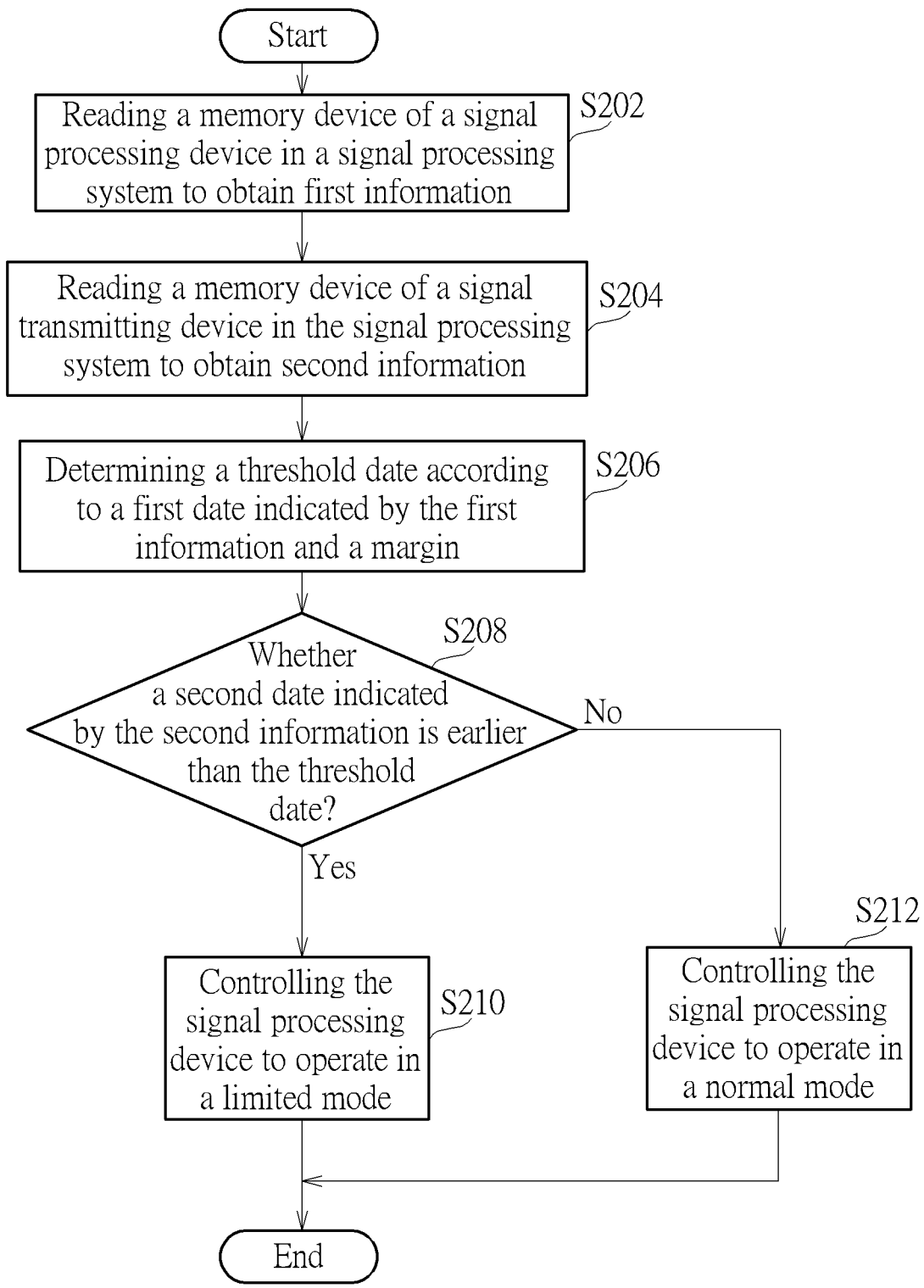
FIG. 2 is an exemplary flow chart of a method for identifying and pairing a signal transmitting device according to an embodiment of the invention.

FIG. 2 is an exemplary flow chart of a method for identifying and pairing a signal transmitting device according to an embodiment of the invention. The proposed method for identifying and pairing a signal transmitting device may comprise the following steps:

Step S202: A memory device of a signal processing device in a signal processing system is read in order to obtain first information. As discussed above, the "signal processing device" may be any one of the signal processing device 110 and the signal processing device 310.

Step S204: A memory device of the signal transmitting device in the signal processing system is read in order to obtain second information. It is to be noted that the execution order of step S202 and S204 is not a limit, and step S202 and step S204 may also be combined as one step.

Step S206: A threshold date is determined according to a first date indicated by the first information and a margin.

Step S208: Whether a second date indicated by the second information is earlier than the threshold date is determined. If the determination result shows yes, step S210 is performed. If the determination result shows no, step S212 is performed.

Step S210: The signal processing device is controlled to operate in a limited mode. In the limited mode, the signal processing device is configured not to output any signal to the signal transmitting device or ignore any signal from the signal transmitting device, or the signal processing device only output a limited signal to the signal transmitting device.

Step S212: The signal processing device is controlled to operate in a normal mode. In the normal mode, the signal processing device outputs at least one of a power signal, a control signal, an image signal, a video signal and an audio signal to the signal transmitting device 200, and/or processes at least one of the power signal, the control signal, the image signal, the video signal and the audio signal received from the signal transmitting device 200. That is, under the normal mode, the signal processing device performs the original operations of communication protocol conversion and signal conversion that are supposed to be performed.

According to an embodiment of the invention, the performance of step S212 also means that the signal processing system allows the panel device to be lit up. For example, in one embodiment of the invention, after the signal transmitting device is correctly installed in the system and the processor of the signal processing device determines that the signal transmitting device is a device allowed to be used (i.e., authorized) in this system during the aforementioned device identifying and pairing process, the panel device 321 can be lit up. Because execution of the aforementioned device identifying and pairing process is very quick, after determining that the signal transmitting device is an authorized device, the panel device 321 can be lit up immediately, so the user experience is not affected.

According to an embodiment of the invention, when it is determined that the second date is not earlier than the threshold date, the processor 111/311 may further update the first information based on the second information. In this update operation, the processor 111/311 may update the first date and/or the first information corresponding to the signal processing device 110/310 according to the second date corresponding to the signal transmitting device 200, so as to make the first date indicated by the first information the same as the second date. The processor 111/311 may further store the updated first information in the memory device 112/312, so as to replace the previously recorded first information.

According to an embodiment of the invention, the first date corresponding to the signal processing device 110/310 (or, corresponding to the host device 100 or the display device 300) may be a manufacturing date of the signal processing device 110/310 (or, the host device 100 or the display device 300), and the second date corresponding to the signal transmitting device 200 may be is a manufacturing date of the signal transmitting device 200. It is to be understood that the manufacturing date referred here may refer to some specific information (e.g. date number, serial number, batch number, etc.) which can be used to identify the time when the signal processing device/signal transmitting device was manufactured, and the manufacturing date may represented be year/month/week/day/hour/minute/second or any combination of other common time units, but the invention is not limited to only these representations. Therefore, the initial first information of the signal processing device 110/310 may be set or written into the corresponding memory device when the signal processing device 110/310 (or, the host device 100 or the display device 300) is manufactured or shipped from the factory and the second information of the signal transmitting device 200 may also be set or written into the corresponding memory device when the signal transmitting device 200 is manufactured or shipped from the factory.

In the embodiments of the invention, the first information and the second information may be stored in the respective memory device by using different encoding methods, read/write sequences of bytes or storage address rules, so as to increase the difficulty for the illegal manufacturers/users to identify and obtain the first date and the second date. For example, the first information indicating the first date may be encoded by using the binary code when stored in the corresponding memory device, while the second information indicating the second date may be encoded by using the gray code when stored in the corresponding memory device.

Especially, after the first information has been updated based on the second information, the first date and the second date are substantially the same or identical, but the content stored in the corresponding memory devices or the content presented by the corresponding memory devices may be different since the first information and the second information are respectively stored in the corresponding memory device by using different encoding methods, thereby preventing illegal manufacturers/users from easily identifying the meaning of the first information and the second information.

Since the encoding methods are known to the processor of the signal processing device, the processor may perform the corresponding decoding operations when reading the first information and the second information and obtain the correct first date and the second date.

In addition, in the embodiments of the invention, the number of bits utilized to record the first information and the second information may be higher than a threshold, so as to provide better protection. For example, the number of bits utilized to record the first information and the second information may be more than 16 bits.

In addition, in the embodiments of the invention, when storing or recording the first information and the second information, the processor may also use different read/write orders or sequences of bytes of a word (that is, the Endianness) to write the first information and the second information into the corresponding memory device. For example, the processor may use the style of big-endian (BE) to write the first information into the corresponding memory device and use the style of little-endian (LE) to write the second information into the corresponding memory device.

Under such operations, the same result of the first date and the second date being substantially identical (e.g., in the scenario when the signal transmitting device 200 is allowed to be used or after the first information has been updated) but the content stored in the corresponding memory devices or the content presented by the corresponding memory devices being different can also be achieved. Since the style of Endianness is known to the processor of the signal processing device, the processor may read the first information and the second information by the corresponding Endianness, so as to obtain the correct first date and the second date.

In addition, when storing the first information and the second information, the processor may also use different storage address rules, such as in a discontinuous manner, to store the bits corresponding to the first information and the second information. As an example, the processor does not store all the bits of the first information and the second information in consecutive addresses, but divides the bits of the first information and the second information into multiple parts and selects some discontinuous addresses for storing the bits of each part according to specific rules. Under such operations, the same result of the first date and the second date being substantially identical (e.g., in the scenario when the signal transmitting device 200 is allowed to be used or after the first information has been updated) but the content stored in the corresponding memory devices or the content presented by the corresponding memory devices being different can also be achieved. Since the rules of selecting the memory addresses are known to the processor of the signal processing device, the processor may read the correct address in compliance with the corresponding rules when reading the first information and the second information, so as to correctly obtain the bits of each part of the first information and the second information and restore the content of the first information and the second information based on the obtained bits. Note that it is difficult for the illegal manufacturers/users to obtain the content of the first information and the second information without the knowledge of the rules.

It is to be understood that the foregoing embodiments are only provided for illustration. The method to implement the concept of making the content stored in the corresponding memory devices or the content presented by the corresponding memory devices being different while the actual content of the first date and the second date are substantially identical or the same is not limited to those as illustrated in the foregoing embodiments.

In the embodiments as illustrated above, via the proposed method for identifying and pairing a signal transmitting device or the signal processing system implementing the proposed method, the signal transmitting device may be effectively identified and paired, to prevent the electronic devices and cables/transmission lines from being maliciously copied by unauthorized vendors in the market, while maintaining the convenience in manufacturing, maintaining and inventory managing of the products.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing system, comprising:
   a signal processing device, comprising;
      a processor; and
      a memory device, configured to store first information; and
   a signal transmitting device, coupled to the signal processing device and comprising a memory device configured to store second information,
   wherein in a procedure for identifying and pairing a signal transmitting device, the processor is configured to read the memory device of the signal processing device to obtain the first information, read the memory device of the signal transmitting device to obtain the second information, determine a threshold date according to a first date indicated by the first information and a margin, and determines whether a second date indicated by the second information is earlier than the threshold date,
   when the processor determines that the second date is earlier than the threshold date, the processor controls the signal processing device to operate in a limited mode, and
   in the limited mode, the signal processing device is configured not to output any signal to the signal transmitting device or ignore any signal from the signal transmitting device, or the signal processing device only output a limited signal to the signal transmitting device.

2. The signal processing system as claimed in claim 1, wherein when the processor determines that the second date is not earlier than the threshold date, the processor controls the signal processing device to operate in a normal mode, and in the normal mode, the signal processing device is configured to output at least one of a power signal, a control signal, an image signal, a video signal and an audio signal to the signal transmitting device, or process at least one of the power signal, the control signal, the image signal, the video signal and the audio signal received from the signal transmitting device.

3. The signal processing system as claimed in claim 1, wherein when the processor determines that the second date is not earlier than the threshold date, the processor is configured to control the signal processing device to operate in a normal mode and the processor is further configured to update the first information based on the second information.

4. The signal processing system as claimed in claim 1, wherein the first date is a manufacturing date of the signal processing device, and the second date is a manufacturing date of the signal transmitting device.

5. The signal processing system as claimed in claim 1, wherein the first information and the second information are respectively stored by using different encoding methods, read/write sequences of bytes or storage address rules.

6. The signal processing system as claimed in claim 1, wherein the signal processing device is a bridge device configured in a host device or a display device to perform signal conversion on one or more signals received from or provided to the signal transmitting device, and the signal transmitting device is a cable.

7. A method for identifying and pairing a signal transmitting device, comprising:
reading a memory device of a signal processing device in a signal processing system to obtain first information;
reading a memory device of the signal transmitting device in the signal processing system to obtain second information;
determining a threshold date according to a first date indicated by the first information and a margin;
determining whether a second date indicated by the second information is earlier than the threshold date; and
controlling the signal processing device to operate in a limited mode when the second date is determined earlier than the threshold date,
wherein in the limited mode, the signal processing device is configured not to output any signal to the signal transmitting device or ignore any signal from the signal transmitting device, or the signal processing device is configured to only output a limited signal to the signal transmitting device.

8. The method as claimed in claim 7, further comprising:
controlling the signal processing device to operate in a normal mode when the second date is determined not earlier than the threshold date,
wherein in the normal mode, the signal processing device is configured to output at least one of a power signal, a control signal, an image signal, a video signal and an audio signal to the signal transmitting device, or process at least one of the power signal, the control signal, the image signal, the video signal and the audio signal received from the signal transmitting device.

9. The method as claimed in claim 7, further comprising:
controlling the signal processing device to operate in a normal mode and updating the first information based on the second information when the second date is determined not earlier than the threshold date.

10. The method as claimed in claim 7, wherein the first date is a manufacturing date of the signal processing device, and the second date is a manufacturing date of the signal transmitting device.

11. The method as claimed in claim 7, wherein the first information and the second information are respectively stored by using different encoding methods, read/write sequences of bytes or storage address rules.

12. The method as claimed in claim 7, wherein the signal processing device is a bridge device configured in a host device or a display device to perform signal conversion on one or more signals received from or provided to the signal transmitting device, and the signal transmitting device is a cable.

* * * * *